(12) United States Patent
Gale et al.

(10) Patent No.: US 6,861,820 B2
(45) Date of Patent: Mar. 1, 2005

(54) CONTROL STRATEGY FOR AN ELECTRIC MOTOR USING REAL TIME PREDICTIONS OF MOTOR CAPABILITY BASED ON THERMAL MODELING AND MEASUREMENTS

(75) Inventors: Allan Roy Gale, Livonia, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,007

(22) Filed: Sep. 9, 2002

(65) Prior Publication Data

US 2004/0046525 A1 Mar. 11, 2004

(51) Int. Cl.[7] .............................. H02P 1/24; H02P 1/42; H02P 3/18; H02P 5/28; H02P 7/36
(52) U.S. Cl. ........................ 318/727; 318/471; 318/473; 318/783; 388/934; 180/412; 361/25
(58) Field of Search ................................. 318/471, 473, 318/783, 727, 782, 789, 792; 388/934; 180/412; 361/25

(56) References Cited

U.S. PATENT DOCUMENTS

| | | | |
|---|---|---|---|
| 4,219,798 A | | 8/1980 | Frister |
| 4,334,160 A | * | 6/1982 | McCarty ..................... 310/57 |
| 4,550,815 A | | 11/1985 | Gale |
| 5,343,970 A | | 9/1994 | Severinsky |
| 5,525,881 A | * | 6/1996 | Desrus ....................... 318/471 |
| 5,532,671 A | | 7/1996 | Bachman et al. |
| D378,500 S | | 3/1997 | Nakai et al. |
| 5,898,282 A | * | 4/1999 | Drozdz et al. .............. 318/139 |
| 5,988,307 A | * | 11/1999 | Yamada et al. ............. 180/243 |
| 6,092,618 A | * | 7/2000 | Collier-Hallman .......... 180/422 |
| 6,175,303 B1 | | 1/2001 | Theofanopoulos et al. |
| 6,291,958 B1 | | 9/2001 | Amey et al. |
| 6,426,601 B1 | * | 7/2002 | De Filippis et al. ........ 318/139 |
| 6,580,188 B2 | * | 6/2003 | Katagiri et al. ........... 310/67 A |
| 6,634,447 B1 | * | 10/2003 | Matsubara et al. ........ 180/65.2 |
| 6,655,485 B1 | * | 12/2003 | Ito et al. .................... 180/65.6 |
| 2001/0013831 A1 | | 8/2001 | Harling et al. |
| 2001/0033234 A1 | | 10/2001 | Kyrtsos et al. |

* cited by examiner

Primary Examiner—David Martin
Assistant Examiner—Renata McCloud
(74) Attorney, Agent, or Firm—Brooks Kushman P.C.; Carlos Hanze

(57) ABSTRACT

A system and method for controlling an electric motor using real time predictions of motor capability based on thermal modeling and measurements is provided. The invention includes controllers for receiving and processing system input signals, strategies for: determining a maximum energy amount that can be put into the motor before the motor reaches a maximum allowable temperature; determining a motor power assist value that the motor can provide in a predetermined period of time before the motor reaches the maximum allowable temperature; determining a battery power assist value; determining a maximum power assist value that is the minimum of the motor power assist value and the battery power assist value; and comparing the maximum power assist value to a driver demand signal. Strategy outputs can be sent to a vehicle system controller and/or a power assist gauge.

34 Claims, 2 Drawing Sheets

CONTROL STRATEGY FOR AN ELECTRIC MOTOR USING REAL TIME PREDICTIONS OF MOTOR CAPABILITY BASED ON THERMAL MODELING AND MEASUREMENTS

FIELD INVENTION

The present invention relates generally to an electrically powered vehicle, such as an electric vehicle (EV), an hybrid electric vehicle (HEV) or a fuel cell vehicle (FCV). More specifically, the invention relates to a control strategy for an electric motor. Even more specifically, the invention relates to a strategy to control an electric motor using real time predictions of motor capability based on thermal modeling and measurements.

BACKGROUND OF INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a parallel/series "split" configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge a battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shut down. Nevertheless, new ways must be developed to optimize the HEV's potential benefits.

One such area of development is controlling the operation of the electric motor or motors in the HEV. Such controls include the operation of the electric motor or motors in an HEV (and other vehicles propelled by electric motors) that factors the thermal limits of the electric motor or motors. Temperature limiting controllers for electric motors are known in the art. For example, U.S. Pat. No. 6,291,958 Amey et al., describes a method for actively controlling the temperature of an electric motor, where the operation of the electric motor is adjusted such that the temperature of the electric motor does not exceed a predetermined reference limit.

Also known in the art are monitors, gauges and displays that show the amount of energy assist an electric drive system can provide to the internal combustion engine of an HEV.

Nevertheless, the ability to determine the amount of energy assist an electric motor that factors the thermal limitations of the electric motor remains an unmet need in the art.

SUMMARY OF INVENTION

Accordingly, the present invention provides a system and method for controlling an electric motor (motor) using real time predictions of motor capability based on thermal modeling and measurements. The present invention includes a strategy to control an electric motor that includes using real time predictions of motor capability based on thermal modeling and measurements. The invention can include one or more controllers for receiving and processing a plurality of system input signals. A first strategy determines a maximum energy amount that can be put into the motor before the temperature of the motor rises to a maximum allowable temperature. A second strategy determines a motor power assist value the motor can provide in a predetermined period of time before the motor reaches the maximum allowable temperature. A third strategy determines a battery power assist value. A fourth strategy determines a maximum power assist value that is the minimum of the motor power assist value and the battery power assist value. A fifth strategy compares the maximum power assist value to a driver demand signal. The minimum of the maximum power assist value and the driver demand signal can be output to a vehicle system controller.

The motor power assist value and the maximum power assist values can also be output to the vehicle system controller. The maximum power assist value can also be output to a power assist gauge.

The strategy for determining the maximum energy amount can use heat transfer determination to calculate the temperature of various motor components as a function of time. The strategy for determining the motor power assist value can use a look up table to find the maximum power assist value based on current motor operating conditions and the maximum energy amount. The battery power assist value is based on a battery state of charge signal. The predetermined time period can be based on vehicle operating conditions or be a fixed value. For example, a time period of about 10 seconds can be used to represent the time for a typical passing maneuver.

Other features and advantages of the present invention will become more apparent to persons having ordinary skill in the art to which the present invention pertains from the following description taken in conjunction with the accompanying figures.

BRIEF DESCRIPTION OF DRAWINGS

The foregoing advantages, and features, as well as other advantages, will become apparent with reference to the description and figures below, in which like numerals represent like elements and in which.

DETAILED DESCRIPTION

Figure 1:
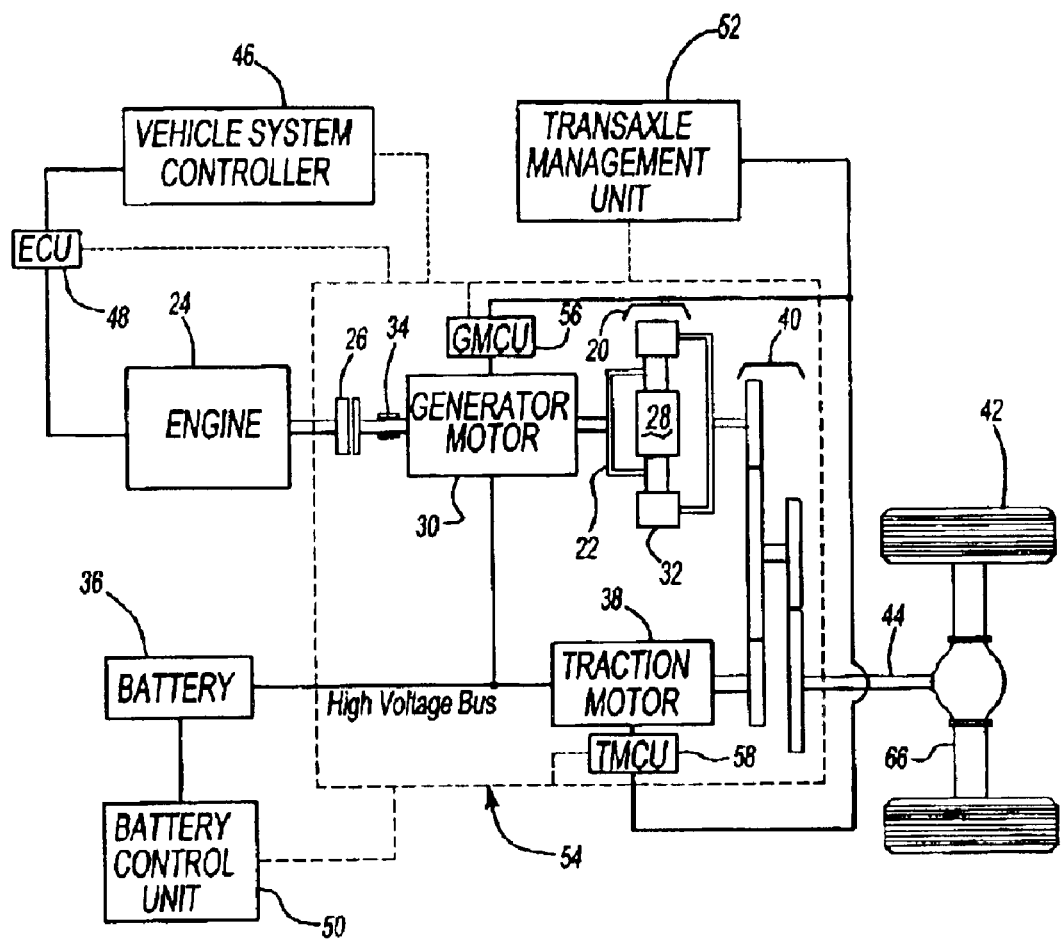
FIG. 1 illustrates a general hybrid electric vehicle (HEV) configuration.

The present invention relates to electric motors. As the use of electric motors in vehicle applications increases, robust motor operation and diagnosing potential faults becomes an important factor to assure vehicle drivability and driver expectations is becoming more important. This is especially apparent in the harsh conditions typically experienced by motors used as vehicle components. For demonstration purposes and to assist in understanding the present invention, the present invention is applied to an hybrid electric vehicle (HEV) application. FIG. 1 demonstrates one possible HEV configuration, specifically a parallel/series hybrid electric vehicle (split) configuration. The present invention includes a strategy to control an electric motor that includes using real time predictions of motor capability based on thermal modeling and measurements.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. All vehicle controllers can be physically combined in any combination or can stand as separate units. They are described as separate units here because they each have distinct functionality. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface to a generator motor control unit (GMCU) 56 and a traction motor control unit (TMCU) 58. The control units 46, 48, 50, 52, 56, and 58 and controller area network 54 can include one or more microprocessors, computers, or central processing units; one or more computer readable storage devices; one or more memory management units; and one or more input/output devices for communicating with various sensors, actuators and control circuits.

The present invention is a strategy to control an electric motor, such as the traction motor 38, using real time prediction of motor capability based on thermal modeling and measurements. This invention can be in a computer readable format embodied in one of the computing devices described above.

Figure 2:
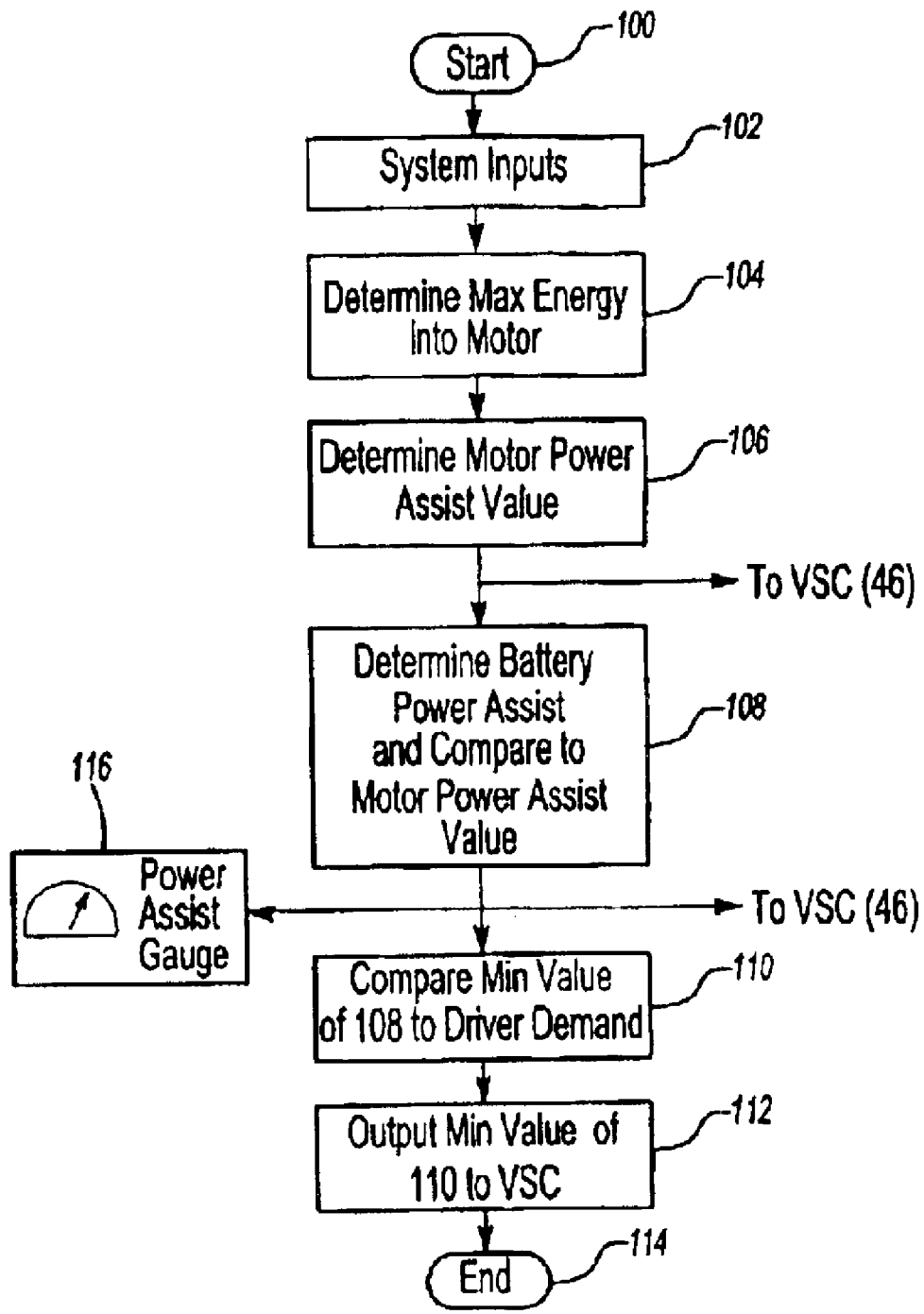
FIG. 2 illustrates a control strategy for an electric motor using real time prediction of motor capability based on thermal modeling and measurements.

FIG. 2 illustrates the control strategy of the present invention for an electric motor using a prediction of the generator/motor 30 (motor 30) capability based on thermal modeling and measurements. The strategy starts at 100 and proceeds to system inputs at step 102. System inputs 102 can include signals for motor temperature, which can be motor stator copper temperature and/or stator iron temperature; oil temperature; transmission temperature; ambient air temperature; and motor speed (RPM). Additional temperature signals and additional motor operating condition signals can be used to further refine the present invention.

The strategy next proceeds to step 104. Using inputs from step 102, the strategy determines how much energy can be put into the motor 30 before the motor 30 reaches a maximum allowable temperature. The maximum energy amount can be calculated from the present motor 30 temperature, the ambient air temperature, and heat transfer determinations, known in the art, to predict motor temperatures during the predetermined time period. The heat transfer determinations can include calculating a temperature rise as a function of time of motor 30 components that results from motor 30 operation. The motor 30 components can include motor stator copper and motor stator iron. The strategy next proceeds to step 106 when the maximum energy amount is used as an input.

At step 106, a look up table can be used to determine how much power the motor 30 can provide for the predetermined time period before the motor 30 reaches the maximum allowable temperature. The look up table can contain data referencing at least one of the plurality of system input signals and the maximum energy amount. For example, the look up table can use the motor 30 speed, in RPM, and the maximum energy amount to determine how much power the motor 30 can provide for the predetermined time period before the motor 30 reaches the maximum allowable temperature. This motor 30 power assist value can be sent directly to the VSC 46 or the strategy can proceed to 108.

For steps 104 and 106, the length of the predetermined time period can be based on vehicle operating conditions. For example, a time period of about 10 seconds can be used to represent the amount of time for a typical passing maneuver. Longer or shorter time periods can be used.

At 108, the strategy determines the amount of power assist the battery 36 is able to provide. This can be accomplished using a battery 36 state of charge signal or other means known in the art. The battery 36 power assist value is compared against the motor 30 power assist value. The minimum of the battery 36 power assist value and the motor 30 power assist value is a maximum power assist value. The maximum power assist value can be transmitted directly to an available power assist gauge 116, known in the art, to the VSC 46, or the strategy can proceed to step 110, where the maximum power assist value is compared to a driver demand request.

Following step 110, the strategy proceeds to step 112. At step 112, the strategy generates a signal to be communicated to the VSC 46 that is the minimum of either the driver demand request or the allowable power assist value. The strategy ends at step 114.

The above-described embodiments of the invention are provided purely for purposes of example. Many other variations, modifications, and applications of the invention may be made.

What is claimed is:

1. A system for controlling an electric motor in a motor vehicle, comprising:
   at least one controller for receiving and processing a plurality of system input signals;
      a first step embodied within the at least one controller for determining a maximum energy amount that can be put into the motor before the temperature of the motor is caused to rise to a maximum allowable temperature;
      a second step embodied within the at least one controller for determining a motor power assist value that the motor can provide in a predetermined time period before the motor reaches said maximum allowable temperature;
      a third step embodied within said at least one controller for determining a battery power assist value;
      a fourth step embodied within said at least one controller for determining a maximum power assist value that is the minimum of said motor power assist value and said battery power assist value;
   means for outputting said motor power assist value to a vehicle system controller;
   a means for outputting said maximum power assist value to said vehicle system controller.

2. The system according to claim 1, wherein said system further comprises:
   a fifth step embodied within the at least one controller for comparing said maximum power assist value to a driver demand signal; and
   means for outputting a minimum of said maximum power assist value and said driver demand signal to said vehicle system controller.

3. The system according to claim 1, wherein said system further comprises means for outputting said maximum power assist value to a power assist gauge.

4. The system according to claim 1, wherein said battery power assist value is based on a battery state of charge signal.

5. The system according to claim 1, wherein said system inputs comprise:
   ambient air temperature;
   motor temperature; and
   motor speed.

6. The system according to claim 5, wherein said motor temperature comprises a stator copper temperature.

7. The system according to claim 1, wherein said predetermined time period is about 10 seconds.

8. The system according to claim 1, wherein said predetermined time period is based on vehicle operating conditions.

9. The system according to claim 1, wherein said first step comprises calculating the temperature of a plurality of motor components as a function of time using heat transfer determinations.

10. The system according to claim 9, wherein said plurality of motor components comprises:
    motor stator copper; and
    motor stator iron.

11. The system according to claim 1, wherein said second step uses a look up table to determine said motor power assist value.

12. The system according to claim 11, wherein said look up table contains data referencing at least one of said plurality of system input signals and said maximum energy amount.

13. A method for controlling an electric motor in an hybrid electric vehicle, comprising the steps of:
    monitoring and processing a plurality of system input signals;
    determining a maximum energy amount that can be put into the motor before the temperature of the motor rises to a maximum allowable temperature;
    determining a motor power assist value that the motor can provide in a predetermined period of time before the motor temperature rises to said maximum allowable temperature;
    determining a battery power assist value;
    determining a maximum power assist value that is the minimum of said motor power assist value and said battery power assist value; and
    outputting said motor power assist value to a vehicle system controller.

14. The method according to claim 13, wherein said step of determining a battery power assist value comprises the step of deriving said battery power assist value from a battery state of charge signal.

15. The method according to claim 13, further comprising the step of outputting said maximum power assist value to the vehicle system controller.

16. The method according to claim 13, further comprising the step of outputting said maximum power assist value to a power assist gauge.

17. The method according to claim 13, further comprising the steps of:
    comparing said maximum power assist value to a driver demand signal; and
    outputting a minimum of said maximum power assist value and said driver demand signal to the vehicle system controller.

18. The method according to claim 13, wherein said step of monitoring and processing a plurality of system inputs comprises the steps of:
    monitoring and processing a signal for ambient air temperature;
    monitoring and processing at least one signal for motor temperature; and
    monitoring and processing a signal for motor speed.

19. The method according to claim 18, wherein said step of monitoring and processing at least one signal for motor temperature comprises the step of monitoring and processing a signal for motor stator copper temperature.

20. The method according to claim 13, wherein said step of determining a maximum energy amount that can be put into the motor before the motor reaches a maximum allowable temperature comprises the step of calculating the temperature of a plurality of motor components as a function of time using heat transfer determinations.

21. The method according to claim 20, wherein said plurality of motor components comprises:
motor stator copper; and
motor stator iron.

22. The method according to claim 13, wherein said step of determining a motor power assist value that the motor can provide in a predetermined period of time before the motor temperature reaches said maximum allowable temperature comprises the step of determining said motor power assist value using a look up table.

23. The method according to claim 22, wherein said look up table contains data referencing said at least one of said plurality of system input signals and said maximum energy amount.

24. The method according to claim 13, wherein said predetermined time period is about 10 seconds.

25. The method according to claim 13, wherein said predetermined time period is based on vehicle operating conditions.

26. An article of manufacture, comprising:
a computer readable storage device; and
a plurality of steps in computer readable format embodied in said computer readable storage device for directing a computer to control monitoring and processing a plurality of system input signals, said steps comprising
a determination of a maximum energy amount that can be put into an electric motor before the temperature of the motor rises to a maximum allowable temperature,
a determination of a motor power assist value that the motor can provide in a predetermined period of time before the motor reaches said maximum allowable temperature, determining a battery power assist value,
a determination of a maximum power assist value that is the minimum of said motor power assist value and said battery power assist value, comparing said maximum power assist value to a driver demand signal, and
an output of a minimum of said maximum power assist value and said driver demand signal to a vehicle system controller.

27. A vehicle, comprising:
a computer readable storage device; and
a plurality of steps in computer readable format embodied in said computer readable storage device for directing a computer to control monitoring and processing a plurality of system input signals said steps comprising:
a determination of a maximum energy amount that can be put into an electric motor before the temperature of the motor rises to a maximum allowable temperature,
a determination of a motor power assist value the motor can provide in a predetermined period of time before the motor temperature reaches said maximum allowable temperature, determining a battery power assist value,
a determination of a maximum power assist value that is the minimum of said motor power assist value and said battery power assist value, comparing said maximum power assist value to a driver demand signal, and
an output of a minimum of said maximum power assist value and said driver demand signal to a vehicle system controller.

28. A method for controlling an electric motor in an hybrid electric vehicle, comprising the steps of:
determining a maximum allowable temperature for the motor;
determining a motor power assist value that the motor can provide in a predetermined period of time before the motor temperature rises to said maximum allowable temperature;
determining a battery power assist value; and
controlling the motor to a maximum power assist value that is the minimum of said motor power assist value and said battery power assist value.

29. The method according to claim 28, wherein said step of determining a battery power assist value comprises the step of deriving said battery power assist value from a battery state of charge signal.

30. The method according to claim 28, further comprising the step of outputting said maximum power assist value to at least one of a vehicle system controller and a power assist gauge.

31. The method according to claim 30, further comprising the steps of:
comparing said maximum power assist value to a driver demand signal; and
outputting a minimum of said maximum power assist value and said driver demand signal to the vehicle system controller.

32. The method according to claim 28, wherein said step of determining the motor power assist value comprises the step of calculating the temperature of a plurality of motor components as a function of time using heat transfer determinations.

33. The method according to claim 28, wherein said step of determining the motor power assist value comprises determining said motor power assist value using a look up table that contains data referencing at least one of said plurality of system input signals and a maximum energy amount that can be transferred to the motor before the motor reaches said maximum allowable temperature.

34. The method according to claim 28, wherein said predetermined period of time is based on vehicle operating conditions.

* * * * *